IMAGE PICKUP DEVICES AND SCANNING CIRCUITS THEREFOR

Filed Sept. 25, 1961 4 Sheets-Sheet 1

INVENTORS
JOSEPH KNOLL
ISRAEL J. MELMAN
BY Roy C. Hopgood
ATTORNEY

IMAGE PICKUP DEVICES AND SCANNING CIRCUITS THEREFOR

Filed Sept. 25, 1961 4 Sheets-Sheet 2

INVENTORS
JOSEPH KNOLL
ISRAEL J. MELMAN
BY Roy C. Hopgood
ATTORNEY

INVENTORS
JOSEPH KNOLL
ISRAEL J. MELMAN
BY
Roy C. Hopgood
ATTORNEY

INVENTORS
JOSEPH KNOLL
BY ISRAEL J. MELMAN
Ray C. Hopgood
ATTORNEY

3,111,556
IMAGE PICKUP DEVICES AND SCANNING CIRCUITS THEREFOR

Joseph Knoll, Springfield Gardens, and Israel J. Melman, Rockville Centre, N.Y., assignors to Servo Corporation of America, Hicksville, N.Y., a corporation of New York Filed Sept. 25, 1961, Ser. No. 140,553
20 Claims. (Cl. 178—7.1)

This invention relates to image pickup devices which are responsive to electromagnetic radiation patterns and to scanning circuits for translating the radiation patterns into varying voltages or currents. The invention can be used in any image detection or reproduction system, such as radar, television, facsimile, or the like, but it is particularly useful in infrared image detection and reproduction systems, which have become very important in recent years in connection with the detection and tracking of missiles.

In the past, workable infrared detection and reproduction systems have been made by forming mosaics or arrays of small photosensitive elements and scanning the mosaic with a high speed mechanical scanner system. A radiation pattern, or image, is focused on the mosaic by a lens system, and the output of each photosensitive element of the mosaic represents one point of the image received thereby, while each row of photosensitive elements represents one line of the image. Each photosensitive element is connected by means of an individual conductor onto the mechanical scanner, which switches the elements onto an output conductor in time sequence to scan one line of the image. The image lines can be scanned simultaneously or in time sequence to produce a rough approximation of the entire image in terms of varying voltages or currents.

Although these prior art devices are adequate in certain applications, they have serious limitations which render them inadequate for high speed, high resolution reconnaissance, search-track, or instrumentation systems. In the first place, their resolution can only be improved by making the individual photosensitive elements smaller and by multiplying the number of elements in a line and the number of lines in an array. Since each element must be connected to the scanning switches by an individual conductor, this produces a corresponding multiplication in the number of conductors and switches in the device. This multiplication of components results in a serious reliability problem and also increases the weight, size, and power requirements of the device to an impractical level for airborne or satellite-borne equipment. Furthermore, as the photosensitive elements are made smaller, serious problems arise in connection with fabricating the mosaic, thereby multiplying the cost of the device by an even greater factor. In addition, a multiplication of the photosensitive elements implies that the switching speed of the mechanical scanner must be correspondingly increased to maintain the same scanning rate. It will be appreciated by those skilled in the art that high resolution and high speed scanning cannot be achieved under these limitations.

Some of the above noted limitations have been overcome in electronically scanned image pickup tubes, such as the infrared vidicon, in which a photosensitive target surface is scanned by a moving electron beam. These tubes have been in the process of development for many years, and they show promise of meeting the resolution and speed requirements of the space age, but to date the application of these tubes has been limited by their size, their high power and cooling requirements, and their limited spectral response and sensitivity. These tubes will undoubtedly be improved in the future, but they will still be relatively large and of limited threshold sensitivity due to several factors which are inherent in their structure.

Since these tubes all operate on the principle of modulating an electron beam, their ultimate threshold sensitivity is limited by the noise level on the electron beam, which is inherently high. Furthermore, the formation of an electron beam requires a relatively long, relatively heavy tube structure with focusing coils, deflection coils, and relatively high power, which in turn places a rather high limit on the ultimate size and weight of these tubes. Therefore, even though these tube devices may be developed to meet the resolution and speed requirements of contemporary systems, they will still have serious drawbacks in aircraft or spacecrafts system, or in any other system where space and weight are limited and sensitivity is an important factor.

Accordingly, one object of this invention is to provide an image pickup device which is smaller, lighter, sturdier, simpler in structure, and more reliable in operation than those heretofore known in the art.

Another object of this invention is to provide a high speed image scanning circuit which is simpler in structure, more efficient, more reliable in operation, and more sensitive than those heretofore known in the art.

A further object of this invention is to provide a high resolution, high speed image detection and scanning system which is smaller, lighter, sturdier, simpler in structure, more efficient, more compact, more reliable in operation, and more sensitive than those heretofore known in the art.

Other objects and advantages of this invention will become apparent to those skilled in the art from the following description of several specific embodiments thereof, as illustrated in the attached drawings, in which.

The operation of this invention is based on a semiconductor property that was known in the prior art but which has not heretofore been utilized in image detection and scanning systems. It has been found in prior art that minority carriers can be created at predetermined points in a doped semiconductor material by directing a beam of radiation at the desired point. The beam of radiation excites impurity centers in the semiconductor and releases a localized packet of minority carriers at the radiation input point. These minority carriers persist long enough to be driven through the semiconductor material by means of a voltage gradient to a collector junction which is spaced from the radiation input point. In the past, this phenomenon was used to measure carrier mobility and carrier lifetime in semiconductor materials, as described by N. B. Hannay on pages 44 and 45 of his book "Semiconductors," which was published by the Reinhold Publishing Corporation of New York in 1959. In this prior art circuit, the carrier mobility in a strip of semiconductor material was measured by applying a known voltage gradient across the strip, creating a packet of minority carriers at one end of the strip by means of a burst of radiation, and then measuring the time required for the packet of minority carriers to move through the strip to a collector electrode at the other end thereof. The minority carriers, of course, appeared as a pulse of current on the collector, and the transit time was measured by the time difference between the burst of input radiation and the output pulse on the collector. In some applications of this circuit, the radiation input was maintained constant and the voltage gradient was switched. In this case, the transit time was determined by measuring the time difference between the application of the voltage gradient and the output pulse of the collector. Carrier mobility, of course, was computed from transit time by well known equations.

In accordance with this invention, however, it has been found that the carrier concentration, resolution, mobility, and noise level of these radiation created carriers are of such nature as to permit a faithful reproduction of the radiation pattern incident on the entire semiconductor strip. In accordance with this invention, the above described measuring circuit is transformed into a high resolution image pick-up device by allowing radiation to fall on the entire semiconductor strip, and the radiation pattern incident therealong is translated into a varying voltage level by switching the potential gradient on for a predetermined length of time. The practicality and advantages of this novel image detection and scanning system will become apparent to those skilled in the art from the following description and mathematical analysis of one illustrative embodiment thereof.

Figure 1:
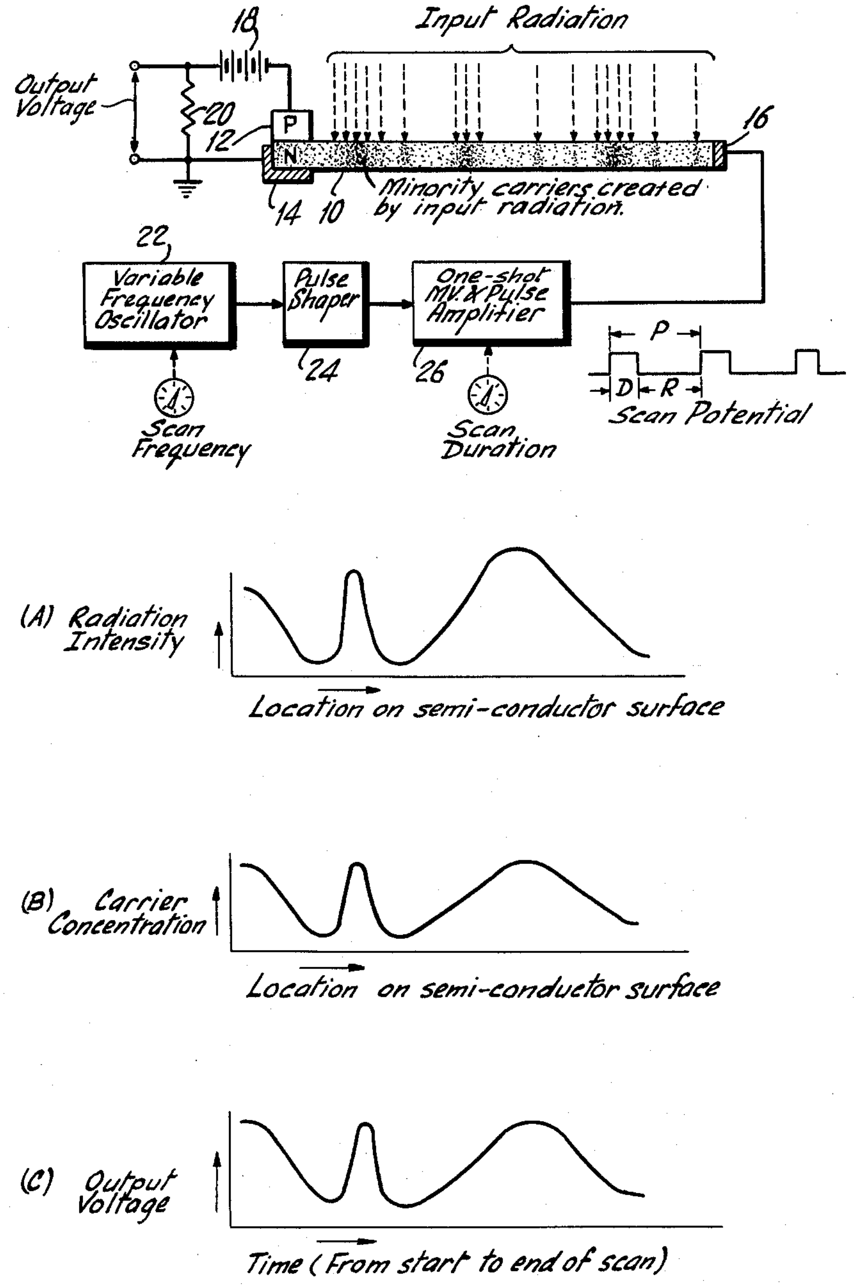
FIG. 1 is a partial schematic diagram of one illustrative image pickup device of this invention and one illustrative scanning circuit therefor along with a set of waveforms illustrating the operation thereof.

FIG. 1 shows one simple embodiment of this invention which utilizes a single strip of N type semiconductor material 10 having a P type collector 12 at one end thereof and a pair of scanning contacts 14 and 16 connected to opposing ends thereof. The PN junction formed by collector 12 and semiconductor material 10 is normally back biased by a D.C. voltage source 18 which is coupled in series with a load resistor 20. Input radiation is allowed to fall along the full length of semiconductor material 10, as illustrated by the dotted lines, thus creating minority carriers all along the strip 10 in accordance with the radiation intensity pattern, which is indicated by the spacing of the dotted lines. The concentration of minority carriers at any point along semiconductor material 10 is proportional to the radiation intensity at that point as shown in graphs A and B of FIG. 1 and as indicated on strip 10 by the concentration of dots, which represent minority carriers. When a positive scan potential is applied to terminal 16, these minority carriers are driven across strip 10 towards electrode 14. As they pass the vicinity of the reverse biased semiconductor collector junction 12, a current proportional to the concentration of minority carriers will flow in load resistor 20 and thereby produce a varying output voltage which reproduces the radiation pattern as shown in graphs B and C. The scan potential must, of course, maintained long enough to allow the minority carrier to travel from one end of semiconductor 10 to the other, and the potential gradient must be high enough to move a packet of minority carriers from one end of the strip to the other before the packet becomes dispersed by diffusion or destroyed by recombination.

In cases where the input radiation pattern changes, as it does in most applications of this device, the device must be scanned periodically. As shown in FIG. 1, a periodic scan generator can be formed quite simply by coupling a variable frequency oscillator 22 to a pulse shaper 24, and using the output of pulse shaper 24 to trigger a one shot multivibrator and pulse amplifier 26 to produce rectangular scanning pulses having a predetermined duration D and a predetermined period P. In this scanning circuit arrangement, the periods P between scans can be set by adjusting the frequency of oscillator 22 and the duration D of each scan can be set by adjusting the on time of one shot multivibrator 26. The rest time R between scans is, of course, equal to the difference between the scan period P and the scan duration D. The scan period P can be set to any desired value down to a lower limit which is determined by the recovery time of the semiconductor material, but the scan duration D is preferably set at the time required for a packet of carriers to move from one end of strip 10 to the other. This time, of course, is determined by the scan potential, the length of strip 10, the diffusion coefficient, and the carrier mobility of the semiconductor material.

The equation of conduction for semiconductor strip 10 is $$(1)\qquad \frac{\partial P}{\partial t}=D\nabla^2 P-\mu(E\cdot\text{grad } P)-\frac{(P-P_0)}{\tau}+g$$

where P is carrier concentration, $t$ is time, D is the diffusion coefficient of the semiconductor material, $\mu$ is carrier mobility, E is the voltage vector, $\tau$ is the minority carrier lifetime, and $g$ is the radiation input rate. This equation is best analyzed by parts. The first of these, $$(2)\qquad \frac{\partial P}{\partial t}=\frac{P-P_0}{\tau}$$

yields $$(3)\qquad P=P_0 e^{(-t/\tau)}$$

where $e$ is the base of the natural logarithms, which sets a practical upper limit of $\tau$ on the time a carrier may be in the scanning field. The second equation $$(4)\qquad \frac{\partial P}{\partial t}=D\frac{\partial^2 P}{\partial X^2}-\frac{P}{\tau}$$

where X is displacement along the semiconductor strip, is the equation for carrier diffusion, which gives information on signal resolution. For monochromatic radiation, Equation 4 has the solution $$(5)\qquad P(X,t)=\frac{1}{4\pi Dt}\int P_{0}^{L}\lambda e^{\left[-\frac{(\lambda-X)^2}{4Dt}\right]}d\lambda$$

where L is the length of the semiconductor strip, $P_0$ is the density of signal carriers at $t=0$, and $\lambda$ is the wave-length of the input radiation. A reasonable measure of resolution can be derived from Equation 5 by considering two signals each having a finite number of carriers concentrated at different points along the semiconductor strip. Let the points be indicated by $X=0$ and $X=a$, and let the signals be represented as delta functions. Then assume that the signals are resolved as long as the carrier concentration at $X=a/2$ is less than ½ of the concentration at $X=0$ or $X=a$. Then $$(6)\qquad P_s(X)=\delta(0)+\delta(a)$$

where $P_s$ is the concentration of signal carriers and $\delta$ (X) is defined by the equation $$(7)\qquad \delta(X)=\int_{-\infty}^{+\infty}F(X)\delta(X)dX=F(0)$$

then from Equation 5 we have $$(8)\qquad P_s(0,t)=P_s(a,t)=\frac{e^{-t/\tau}}{4\pi Dt}\left[1+e^{\left(\frac{-a^2}{4Dt}\right)}\right]$$

and $$(9)\qquad P_s(a/2,t)=\frac{e^{-t/\tau}}{\sqrt{4\pi Dt}}\cdot 2e^{\left[\frac{-1/4a^2}{4Dt}\right]}$$

where $e$=the base of the natural logarithms. For the resolution defined above, $P_s(a/2,t)=\frac{1}{2}P_s(O,t)$, or $$(10)\qquad 4Y=1+Y^4 \text{ where } Y=e^{\left(\frac{-1/4a^2}{4Dt}\right)}$$

Since Y is approximately ¼, $a^2/16Dt=1.38$ or $$(11)\qquad a=4.7\sqrt{Dt}$$

The diffusion constant D is related to carrier mobility $\mu$ by the relation $$D=\frac{KT\mu}{\epsilon} \quad (12)$$

where K is Boltzmann's constant, T is temperature, and $\epsilon$ is the electronic charge. The time $t$ that the signal remains in the scanning field is given by the transit time equation as $$t=\frac{L}{\mu E_x} \quad (13)$$

where L is the length of the semiconductor strip and $E_x$ is the voltage gradient therealong. Substituting Equations 12 and 13 into Equation 11 gives the equation for resolution $$a=4.7\sqrt{\frac{KTL}{\epsilon E_x}} \quad (14)$$

which represents the maximum value of resolution in the worst possible case, i.e. the case in which the two signals must travel the full scanning distance L. Since semiconductor materials are presently available with carrier mobilities of 1,000 cm.$^2$/volt second, carrier lifetimes as long as 25 microseconds, and breakdown potentials above 100 v./cm., it will be apparent to those skilled in the art that resolutions of 0.1 mm. can be realized at present, and there is every reason to believe that much better resolutions will be obtainable in the near future as semiconductor materials are improved.

Good resolution, of course, is not the only requirement that a detector of this type must meet. It must also have good sensitivity, i.e. a high signal to noise ratio. There are several types of noise which arise within semiconductor materials, but the most important of these are Johnson noise, which arises from collision of a carrier with the crystal lattice, generation-recombination noise, which arises from the release of minority carriers from impurity centers and their subsequent recombination with majority carriers, and imperfection noise, which is peculiar to this invention. For a characteristic application of this invention, using presently available materials, the Johnson noise can be calculated from known equations to be less than 1/10 of the usual amplifier noise at a temperature of 77° K. This noise level, of course, can be improved by operating at lower temperatures.

Generation-recombination noise is usually the most important noise in any semiconductor material, and it too is reduced as the temperature is lowered. More importantly, though, the generation-recombination noise is greatly reduced by using semiconductors with long carrier lifetimes. Since a long carrier lifetime is desirable in this invention for other important reasons, the generation-recombination noise in this invention is inherently minimized by other design considerations.

Imperfection noise is caused by defects in the crystalline structure of the semiconductor materials, but this noise can be minimized by using carefully grown pure materials. Materials are available at present which are of such a high degree of purity as to reduce imperfection noise to a negligible level. There are several other noise sources in semiconductor devices notably in the contacts, but these too have been reduced to very low levels by contemporary fabrication techniques. In general, the internal noise of this detector from all sources is not significantly higher than the internal noise generated in any other photoconductor, and since this detector does not require an electron beam for scanning, the noise level of this invention is substantially lower than that of the Videcon type detectors, which contain not only photoconductors, but also noisy electron beams and their associated circuits.

From the foregoing description and analysis it will be apparent that the selection of materials is a very important consideration in this invention. The semiconductor material used in the detector should preferably have strong absorption in the desired wavelength region, low carrier mobility, high carrier lifetimes, a high breakdown voltage, and a high degree of crystal perfection. An appropriate selection of currently available materials will produce a resolution of 100 bits per centimeter at scanning times of 10–15 microseconds and a photoconductive figure of merit equal to $10^9$ cm./watts$\sqrt{\text{seconds}}$. Much better characteristics will, of course, be obtainable in the near future as semiconductor materials are improved.

It will also be apparent from the equations that it is desirable to operate the detector strip at low temperatures with high scan potentials and short scan durations to minimize recombination and diffusion of signal carriers. Any suitable materials and scanning circuits can be used which meet these general requirements. The exact characteristics of the material selected, however, will vary in accordance with the specific requirements of each different embodiment of the invention, as will be apparent to those skilled in the art.

Figure 2:
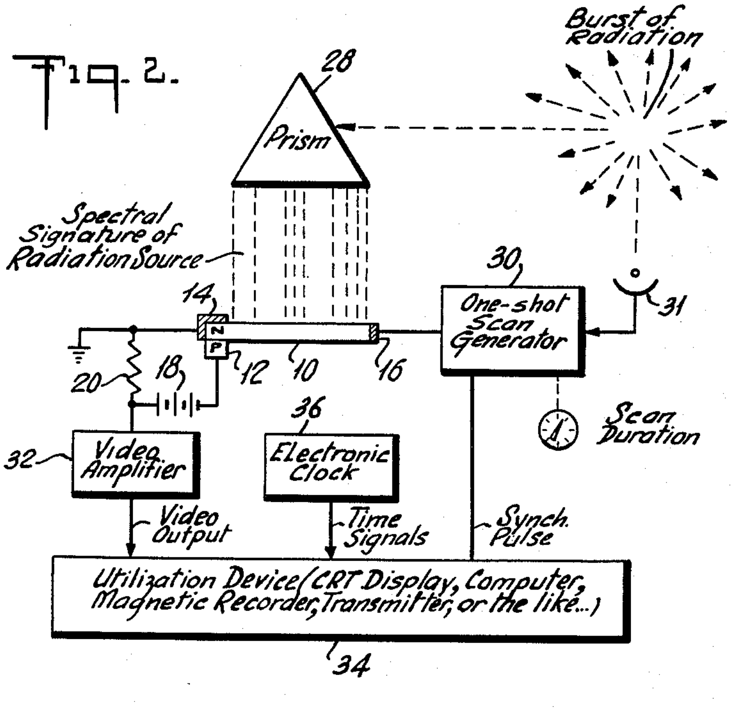
FIG. 2 is a partial schematic diagram of a novel system for identifying the source of a burst of radiation by spectral signature utilizing the embodiment shown in FIG. 1.
Figure 3:
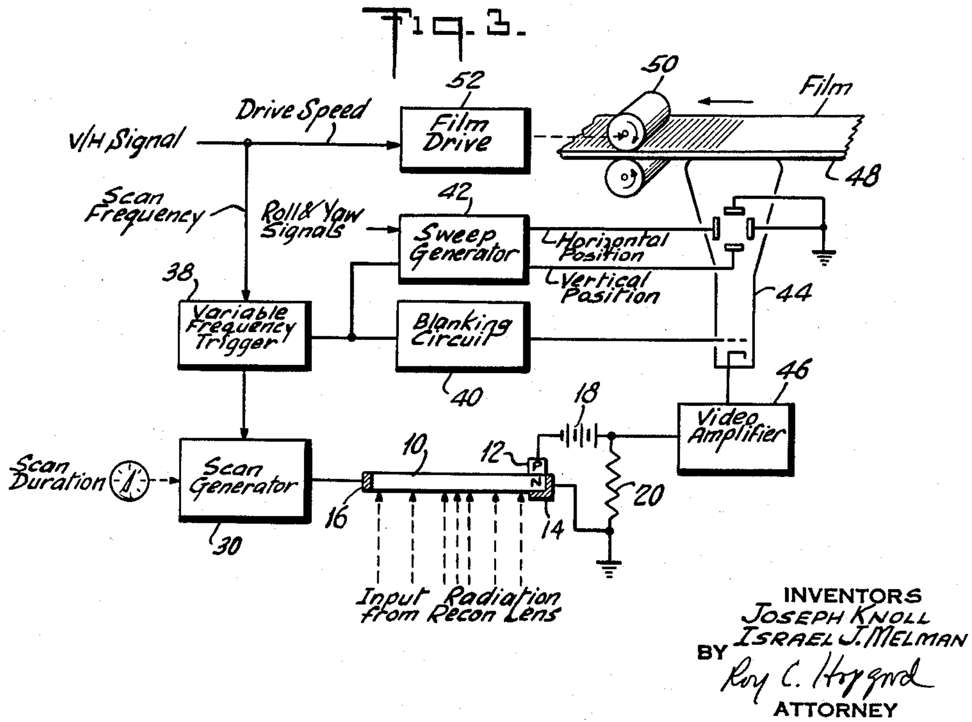
FIG. 3 is a partial schematic of a novel airborne strip mapping system utilizing the embodiment shown in FIG. 1.

Although the embodiment of FIG. 1 only picks up the input radiation pattern along a narrow line, it has many practical applications, as shown, for example, in FIGS. 2 and 3, which illustrate respectively a novel device for identifying a source of radiation by its spectral signature and a novel airborne strip mapping system. The radiation detector of this invention is particularly useful in detecting and identifying short bursts of radiation such as generated by the re-entry of a missile into the earth's atmosphere. When a missile re-enters the atmosphere, it generates a burst of infrared radiation which can be identified by a characteristic spectral composition. As shown in FIG. 2, the embodiment of FIG. 1 can be used to detect and to identify a missile re-entry by routing the input radiation to detector strip 10 through a prism 28, which breaks the input radiation up into its spectral components. The input to prism 28, of course, is passed through a suitable lens system which is not shown in the drawings. In this circuit arrangement, the detector strip 10 could be scanned periodically if desired, but for re-entry detection it is preferable to use a one shot scan generator 30 which is triggered by a photocell 31 that responds to the burst of radiation and starts the scan. Scan generator 30, of course, could produce a train of scans when triggered rather than a single scan, which may be desirable in cases where the burst of radiation is relatively long in duration or varying in spectral composition. Scan generator 30 applies a scan potential of predetermined duration across semiconductor 10 and sweeps the minority carriers over to collector 12 to produce an output signal such as shown in FIG. 1. The output signal is amplified in a video amplifier 32 and applied to a utilization device 34 which may be a cathode ray tube display, a computer, a magnetic recorder, a transmitter, or any other suitable device for utilizing the output signal of amplifier 32. A scan synchronizing pulse is applied from scan generator 30 to utilization device 34, and in some applications it may be desirable to also apply time signals to utilization device 34 from an electronic clock 36 to record the time at which a burst of radiation is received by the device.

There are many different methods of utilizing this device and many suitable utilization circuits that can be used in connection therewith. For example, a signal representing the characteristic spectral composition of missile re-entry radiation might be permanently stored in a function generator in the utilization device, and the function generator could be triggered in synchronism with the detector scan to permit a comparison of the input spectral pattern to the stored spectral pattern. This comparison could be made in a subtraction circuit, whose instantaneous output level would indicate the instantaneous difference between the two patterns. The output of the subtraction circuit would be integrated for the full scan duration, and if the integrated difference signal fell below a predetermined level, this would be an indication that the two patterns were the same. The integrated difference signal could be coupled to a Schmidt trigger which actuated an alarm or indicator circuit when the two patterns coincided. If desired, a number of different characteristic spectral patterns could be stored in the utilization circuit and compared to input spectral pattern. Multiple waveform comparison circuits of this type have been developed for character reading circuits, as is well known to those skilled in the art.

FIG. 3 shows a novel airborne strip mapping system which utilizes the radiation detector and scanning circuit of FIG. 1. This system is adapted to be carried in an aircraft or a satellite, and as the vehicle passes over the earth, a reconnaissance lens system picks up infrared or visible radiation along a predetermined line. This input radiation is conducted through the reconnaissance lens system, which is not shown in the drawings, and focused on detector strip 10, which is scanned by a one shot scan generator 30. Scan generator 30 is triggered periodically by a variable frequency trigger circuit 38, whose output frequency is variable in response to an electrical input signal as will be described later. Trigger circuit 38 also triggers a blanking circuit 40 and a one shot sweep generator 42 which supply a sweep voltage and a blanking voltage to a cathode ray display tube 44. Sweep generator 42 is adapted to produce a single straight line sweep across the face of cathode ray tube 44 each time it is triggered, and this sweep is intensity modulated by the output signal from detector 10, which is applied to the cathode of the cathode ray tube via a video amplifier 46. Each individual trace across the cathode ray tube is recorded on a film strip 48 which is driven across the face of the cathode ray tube by means of a drive roller 50, which is driven at a predetermined speed by a film drive mechanism 52. The film drive speed is set in accordance with a velocity/altitude signal (V/H) generated by the aircraft navigational circuits, which are not shown in FIG. 3. The exact drive speed is selected so that the individual lines recorded on film strip 48 will fit together to give a continuous strip map of the terrain over which the aircraft has passed. The V/H signal is also applied to variable frequency trigger 38 so as to vary the frequency of scanning in accordance with the film drive speed. It will be readily understood by those skilled in the art that as the speed of film 48 is increased the scanning frequency should be correspondingly increased to avoid a gap in the strip map. Conversely, as the film speed is lowered, the scanning frequency should be correspondingly lowered to avoid double exposure on the film. In addition to this automatic adjustment of scanning frequency, it is also necessary to make automatic adjustments of the position of the trace across the cathode ray tube to compensate for roll and yaw of the aircraft, which, of course, changes the position of the reconnaissance lens system by moving it sideways or skewing it with respect to the aircraft velocity vector. To get a faithful reproduction on film strip 48, the sweep of the cathode ray tube must be correspondingly displaced or skewed when the aircraft rolls or yaws. Therefore, it is necessary to include horizontal and vertical positioning circuits in generator 42 which control the location and orientation of the trace in accordance with roll and yaw input signals developed in the aircraft navigational system. Many different circuits for performing this function are well known to those skilled in the art, and any suitable circuit can be used in connection with this invention.

This invention is particularly useful in airborne strip mapping systems as described above because of its high sensitivity, high resolution, high data rate, light weight, and rugged simplicity. The speed and altitude of reconnaissance vehicles has increased enormously in recent years and will continue to increase in the future. It will be apparent to those skilled in the art that this increase demands a corresponding increase in resolution, sensitivity, and data rate to break even on the intelligibility and usefulness of the strip maps. Light weight, low volume, and reliability, of course, have always been of permanent importance in airborne applications, but they have become even more important in space craft and satellites. It will be seen, therefore, that the advantages of this invention are particularly apropos in aircraft or spacecraft installations.

Figure 4:
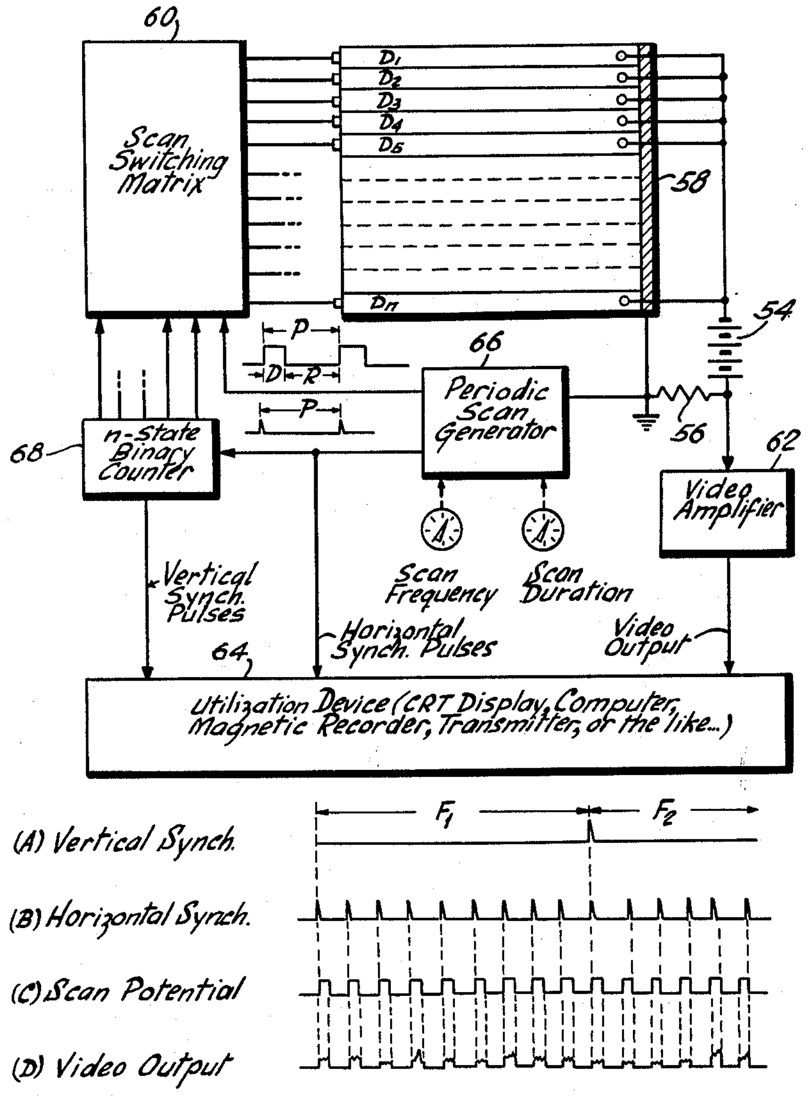
FIG. 4 is a partial schematic diagram of a second image pickup device of this invention and a second scanning circuit therefor along with a set of waveforms illustrating the operation thereof.
Figure 5:
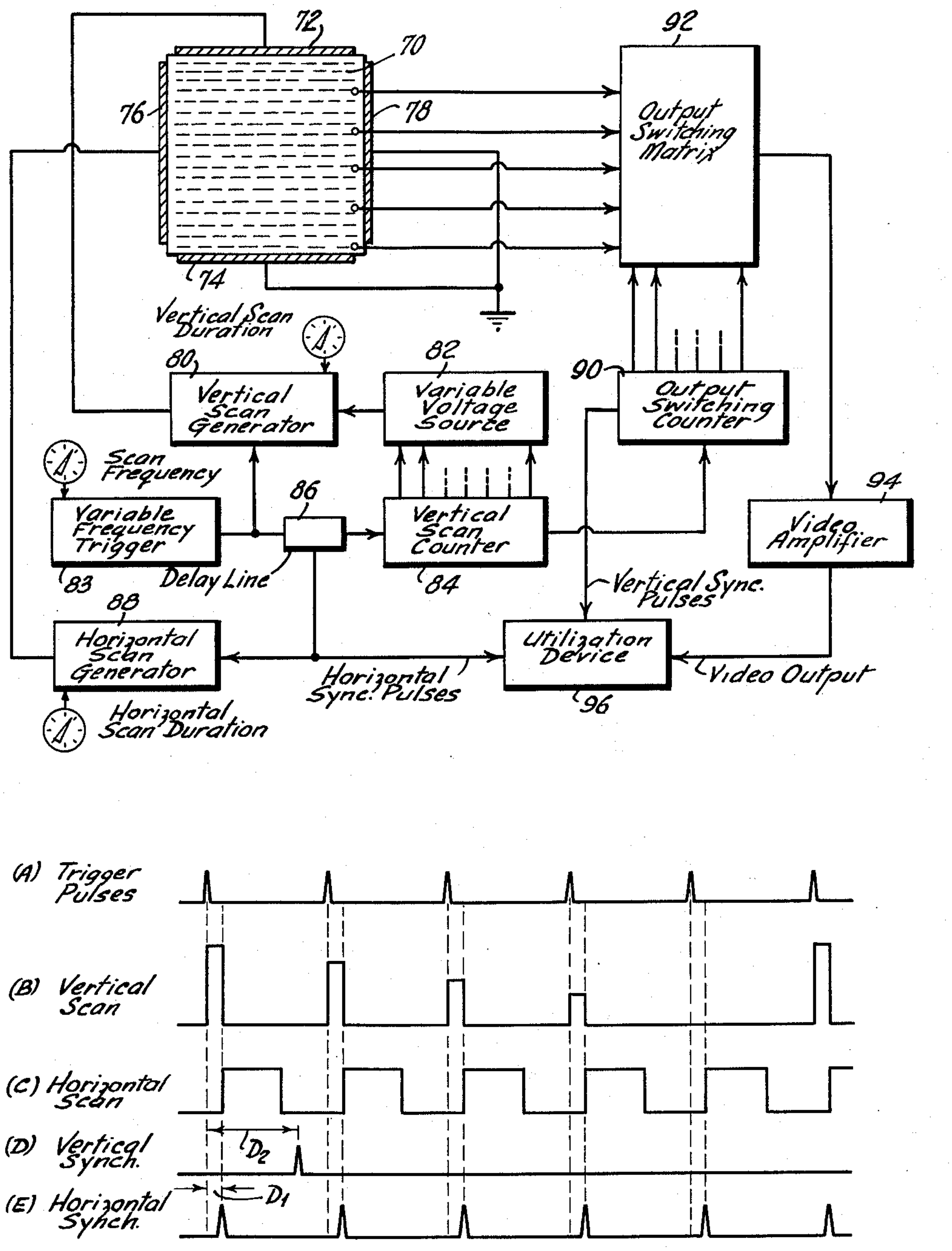
FIG. 5 is a partial schematic diagram of a third image pickup device of this invention and a third scanning circuit therefor along with a set of waveforms illustrating the operation thereof.

Although the single strip detector of FIG. 1 has many other important and useful applications, it will be desirable in other applications to have a detector which is responsive to a relatively large surface area rather than a single line. FIGS. 4 and 5 show two illustrative detector and scanning circuit arrangements for meeting this need. In FIG. 4 a plurality of strip detectors D1 through DN are joined together in parallel to define a detector surface. Each of the detector strips is insulated from the other by a thin non-conducting cement joint, and each detector strip has an individual scan input contact, which appears on the left side of the drawings, and an individual collector electrode, which appears on the right-hand side of the drawings. The collector electrodes, which are indicated by small circles in FIG. 4, each comprise a PN junction such as illustrated in FIG. 1, and all of these collectors are coupled together in parallel to a common back bias potential source 54 and a common output resistor 56. The right-hand end of each strip is grounded to a common ground plate 58.

In this composite detector, the individual detector strips are scanned in time sequence by a scan switching matrix 60 to produce an output signal which is amplified in video amplifier 62 and applied to a utilization device 64. It will be understood by those skilled in the art that the collectors can all be connected to a common output line without any interaction thereinbetween due to their normally back-biased condition and to the fact that a scan potential is applied to only one strip detector at a time. Therefore, when one strip detector is scanned, it will produce an output pulse on the output conductor, while all of the other collectors will remain isolated from the output conductor by the absence of minority carriers in the vicinity of their respective junctions. It is possible, of course, to couple the detectors to an output switching matrix, instead of using the above described parallel output connection.

In this particular embodiment of the invention the scan pulses are generated in a periodic scan generator 66, which produces square scanning pulses having a predetermined duration D and a predetermined period P as discussed in connection with FIG. 1. Periodic scan generator 66 can comprise circuits 22, 24 and 26 of FIG. 1, or any other suitable circuits. The pulse output of scan generator 66 is routed by switching matrix 60 to each of the detector strips in turn so as to scan the entire surface line by line. Scan switching matrix 60 can, for example, constitute a diode switching matrix which is responsive to an input code, and the appropriate input code sequence is developed in an N state flip-flop counter 68 which is triggered by the leading edge of the scan pulse as shown in the waveforms. Although these pulses are shown as coinciding with the leading edge of the scan in the drawings, it will be understood by those skilled in the art that it may often be necessary to delay the scanning pulse with respect to the trigger pulses to give the scan switching matrix 60 and binary counter 68 enough time to switch before the scanning pulse is applied. The trigger pulse output from periodic scan generator 66 is also applied to the utilization device 64 to serve as horizontal synch pulses. A vertical synch pulse is derived from the last stage of counter 68 and also applied to utilization device 64. When counter 68 reaches the end of its N state cycle it will produce an output pulse indicating that it has been cycled through its full cycle of N states and is returning to its starting state for another cycle. Each cycle of the counter, of course, defines one scanning frame for the composite detector, and each individual step of the counter corresponds to a different line or strip of the composite detector, as illustrated in the waveforms, which are drawn for a detector array having nine individual detector strips.

FIG. 5 shows a different surface detector system in which the detector comprises a solid rectangular semiconductor surface 70 which is fitted with a pair of vertical scan plates 72 and 74, a set of horizontal scan plates 76 and 78, and a plurality of spaced collector electrodes each of which is indicated by a circle on the right hand side of the semiconductor plate. When a potential is applied between horizontal scan plates 76 and 78, the minority carriers in the semiconductor plate are all swept across the plate, and any carriers which pass under a collector will induce a proportional current flow therein. Thus, each of the collectors define a horizontal scan line whose width is equal to the effective width of the collector. These lines, of course, are too widely spaced in this embodiment to effectively cover the surface of the semiconductor plate, but the entire surface can be covered by selectively positioning the carriers in the vertical direction before each horizontal scan so that a different line of carriers appears under the collectors on each horizontal scan. This action can be more clearly described with reference to the waveforms in FIG. 5 and to the dotted lines drawn across the surface of detector 70. Each dotted line represents a scan line over the surface. In scanning the entire surface, a large vertical scan pulse is first applied to the detector to drive the carriers in the uppermost dotted line down to the top collector. When a horizontal scan is applied, the top dotted line is then scanned. Prior to the next horizontal scan, a vertical scan pulse of lower amplitude is applied to position the carriers in the second dotted line from the top opposite the top collector. The next horizontal scan, therefore, scans the second dotted line. The vertical scan pulse is then progressively lowered in amplitude until it reaches zero, at which time the dotted line opposite the top collector will be scanned. While all of the lines above the top collector are being scanned, as described above, the lines above each of the other collectors will simultaneously be scanned because the vertical scan pulses move all of the carriers down by the same distance. Therefore, if the output of the collectors is taken in parallel, one of the above described scanning cycles will completely cover the surface of the detector plate. If the output of the collectors is taken in time sequence, however, it will be necessary to repeat the above described cycle once for each collector to completely scan the detector surface. The circuit of FIG. 5 is arranged to work on a sequential scan rather than a parallel scan basis, but it will be apparent to those skilled in the art that the parallel scan will be preferable in many embodiments where scanning time must be held to a minimum.

There are many suitable circuits for generating the scan voltages shown in the waveforms, but in the particular example shown in FIG. 5, the vertical scan potential is derived from a vertical scan generator 80 whose output amplitude is controlled by a variable voltage source 82. Scan generator 80, which produces output pulses of a predetermined duration, is triggered by a trigger circuit 83, which also triggers a horizontal scan generator 88 and a vertical scan counter 84 through a delay line 86. Vertical scan counter 84 is a flip-flop counter which has one state for each amplitude increment of the vertical scan, and variable voltage source 82 is adapted to respond to the output code of vertical scan counter 84 to vary the vertical scan according to the predetermined vertical stepping sequence described previously. This produces the progression of vertical scan pulses shown in waveform A of FIG. 5. Delay line 86 provides a small delay $D_1$ which is slightly longer than the vertical scan duration and a longer time delay $D_2$ which is longer than the sum of the vertical and horizontal scan durations. Time delay $D_1$ insures that the horizontal scan will not overlap the vertical scan, and time delay $D_2$ insures that vertical scan counter 84 will not be triggered until the horizontal scan has been completed. Vertical scan counter 84 produces an output pulse at the end of each vertical stepping sequence, and this output pulse is applied to the input of an output switching counter 90. Output switching counter 90 is a flip-flop counter which has as many different states as there are collectors on the detector, and output switching matrix 92 is responsive to counter 90 to couple the collectors one at a time in sequence to video amplifier 94. It can be seen that delay $D_2$ prevents counters 90 from switching output collectors in the middle of a horizontal scan.

The output signals of the above described detector and scanning circuit are applied to a utilization device 96 which can be any suitable display, computer, recorder, or transmitter circuit. The horizontal synch pulse for the utilization device is taken directly from the input to horizontal scan generator 88, and the vertical synch pulse output is taken from the last stage of output counter 90, which produces an output pulse in switching from the lowermost collector to the uppermost collector. This particular embodiment of the invention is well suited for use as a high speed, high resolution television camera in satellite or spacecraft installations, in which case the utilization device would be a television transmitter in the satellite or spacecraft.

From the foregoing description it will be apparent that this invention provides a novel high resolution, high speed image detection and scanning system which is smaller, lighter, sturdier, simpler in structure, more efficient, more compact, and more reliable in operation than those heretofore known in the art. And it should be understood that this invention is by no means limited to the specific structures disclosed herein by way of example, since many modifications can be made in the structure disclosed without departing from the basic teaching of this invention. For example, although the collectors are shown to be P–N junctions in the preferred embodiments disclosed herein, it will be apparent to those skilled in the art that a simple ohmic contact could just as well serve as a collector electrode. It will be equally apparent that the output signal of the detector could be developed in a transformer rather than across a resistor, as shown in the drawings, and that many other scanning circuits could be used in place of the sequential scan switching circuits shown in FIG. 5. These and many other modifications will be apparent to those skilled in the art, and this invention includes all modifications falling within the scope of the following claims.

We claim:

1. A radiation detection and scanning device comprising a semiconductor material adapted to receive input radiation, said semiconductor material being adapted to release free carriers in response to said input radiation, collector means attached to said semiconductor material and means for applying a scanning voltage gradient to said semiconductor material to drive said free carriers toward said collector means.

2. The combination defined in claim 1, wherein said semiconductor material is adapted to produce localized packets of minority carriers in response to said input radiation, the concentration of said minority carriers at any point in said semiconductor material being a function of the radiation input rate at that point.

3. The combination defined in claim 1, wherein said scanning voltage means is adapted to produce a substantially rectangular scanning voltage pulse of predetermined amplitude and predetermined pulse width.

4. The combination defined in claim 1, wherein said collector means comprises a second semiconductor material which is opposite in conductivity type from said first mentioned semiconductor material, and wherein said first and second semiconductor materials are joined together to form a P–N collector junction.

5. The combination defined in claim 1 and also including a collector potential source coupled to said collector means, said collector potential source being coupled in such polarity as to develop a collector current which is proportional to the concentration of free carriers in the immediate neighborhood of said collector means.

6. A radiation detection and reproduction device comprising a semiconductor material adapted to receive input radiation on a continuous line therealong, said semiconductor material being adapted to release free carriers in response to said input radiation, the concentration of said free carriers at any point on said line being a function of the radiation input rate at that point, collector means attached to said semiconductor material on said line, a collector potential source coupled to said collector means, said collector potential source being coupled in such polarity as to develop a collector current which is a function of the concentration of free carriers in the immediate neighborhood of said collector means, and means for applying a scanning voltage gradient along said line of such polarity as to drive said free carriers toward said collector means.

7. The combination defined in claim 6, wherein said free carriers have a predetermined average lifetime of $\tau$ seconds, and wherein said semiconductor material has a predetermined average carrier mobility of $\mu$ cm.$^2$/volt seconds, and wherein the distance between said collector and the farthest end of said line is equal to L cm., and wherein said scanning voltage means is adapted to produce a substantially rectangular voltage pulse having a predetermined amplitude of E volts and a predetermined pulse duration of D seconds, and wherein said pulse duration D is shorter than $\tau$ seconds and longer than $L/\mu E \pm T$ seconds where T is a tolerance factor, whereby said scanning voltage pulse is operable to move free carriers to said collector means from the farthest end of said radiation input line within the average lifetime thereof.

8. The combination defined in claim 7, wherein said collector means comprises a second semiconductor material, said second semiconductor material being opposite in conductivity type from said first mentioned semiconductor material, said first and second semiconductor materials being joined together to form a P-N collector junction, a collector electrode coupled to said second semiconductor material, and said collector potential source being coupled to said collector electrode in such polarity as to backbias said collector junction.

9. The combination defined in claim 8 and also including a first scan electrode connected to said first semiconductor material at one end of said radiation input line, a second scan electrode connected to said first semiconductor material at the other end of said radiation input line, and wherein said scanning voltage means is coupled between said first and second scan electrodes.

10. The combination defined in claim 9, wherein said collector means is located near said one end of said radiation input line, and wherein said collector potential source is coupled between said collector electrode and said first scan electrode, and also including an output impedance coupled in series with collector potential source.

11. A device for identifying the source of a burst of radiation by spectral signature, said device comprising prism means adapted to receive said burst of radiation and to separate said radiation into its spectral components, a semiconductor material adapted to receive the spectral components of said radiation on a continuous line therealong, said semiconductor material being adapted to release free carriers in response to said spectral components of radiation, the concentration of said free carriers at any point on said line being proportional to the radiation input rate at that point, collector means attached to said semiconductor material on said line, a collector potential source coupled to said collector means, said collector potential source being coupled in such polarity as to develop a collector current which is proportional to the concentration of free carriers in the immediate neighborhood of said collector means, means for applying a scanning voltage gradient of predetermined magnitude and duration along said line in such polarity as to drive said free carriers toward said collector means, and output circuit means coupled to said collector means.

12. A radiation recording system comprising a semiconductor material adapted to receive input radiation on a continuous line therealong, said semiconductor material being adapted to release free carriers in response to said input radiation, the concentration of said free carriers at any point on said line being proportional to the radiation input rate at that point, collector means attached to said semiconductor material at one end of said line, a collector potential source coupled to said collector means in such polarity as to develop a collector current proportional to the concentration of free carriers in the neighborhood of said collector means, an output impedance coupled in series with said collector potential source, means for applying a periodic scanning voltage gradient of predetermined magnitude and duration along said line in such polarity as to drive said free carriers toward said collector means, a cathode ray tube having a cathode electrode, horizontal deflection means, and vertical deflection means, said cathode electrode being coupled to said output impedance to intensity modulate the electron beam of said cathode ray tube in accordance with the output signals from said semiconductor material, a sweep generator coupled to the vertical and horizontal deflection means of said cathode ray tube, said sweep generator being adapted to move said electron beam across the face of said cathode ray tube to produce a linear trace thereacross, means for synchronizing said sweep generator and said scanning voltage means such that said linear trace coincides in time with said scanning voltage gradient, and a film drive mechanism adapted to move a film strip across the face of said cathode ray tube to record said traces thereacross.

13. An airborne strip mapping system comprising a radiation recording system as defined in claim 12, said radiation recording system being adapted to be mounted within an airborne vehicle with said semiconductor material positioned so as to receive input radiation from a reconnaissance lens system mounted therewithin, the film drive mechanism of said radiation recording system being adapted to be responsive to signals indicating the velocity-altitude of said airborne vehicle to produce a strip map of the terrain over which said airborne vehicle passes, and said sweep generator being responsive to roll and yaw signals indicating the attitude of said airborne vehicle to adjust the position of said cathode ray tube trace in accordance with the attitude of said airborne vehicle.

14. A radiation detection and scanning system comprising a plurality of relatively long, relatively narrow strips of semiconductor material each adapted to receive input radiation in a continuous line thereacross, each strip of semiconductor material being adapted to release free carriers in response to said input radiation, the concentration of said free carriers at any point along said strips being proportional to the radiation input rate at that point, said strips being joined together side by side to form a radiation pickup surface which is approximately equal to the length of said semiconductor strips in one surface dimension and approximately equal to the sum of the widths of said semiconductor strips in the other surface dimension thereof, collector means attached to one end of each of said semiconductor strips, a collector potential source coupled to said collector means in such polarity as to develop collector currents proportional to the concentration of free carriers in the neighborhood of said collector means, means for applying a scanning voltage gradient of predetermined magnitude and duration to each of said semiconductor strips along the length thereof and in such polarity as to drive said free carriers toward said collector means, and output circuit means coupled to said collector means.

15. The combination defined in claim 14, wherein said collector means comprises a second semiconductor material attached near one end of each of said semiconductor strips, said second semiconductor material being opposite in conductivity type from the material of the corresponding semiconductor strip, said second semiconductor material being joined to the corresponding semiconductor strip in such manner as to form a P–N collector junction, and wherein said collector potential source is coupled in parallel to each of said collector junctions in such polarity as to normally back-bias said collector junctions, and also including an output impedance coupled in series with said collector potential source and in series with each of said collector junctions, and wherein said output circuit means is coupled to said output impedance and wherein said scanning voltage means is operable to apply said scanning voltage gradient across each of said semiconductor strips in time sequence to sequentially scan said radiation input surface on a line by line basis.

16. The combination defined in claim 15, wherein said scanning voltage means comprises a periodic scan generator adapted to produce periodic output pulses having a predetermined amplitude and a predetermined pulse width, a scan switching means coupled between said periodic scan generator and the opposing ends of said semiconductor strips, said scan switching means being adapted to apply said output pulse across each of said semiconductor strips in time sequence to sequentially scan said radiation input surface on a line by line basis.

17. A radiation detection and scanning system comprising a substantially flat plate of semiconductor material adapted to receive input radiation on one surface thereof, said semiconductor material being adapted to release free carriers in response to said input radiation, and the concentration of said free carriers at any point in said semiconductor material being proportional to the radiation input rate at that point, collector means attached to said semiconductor material, means for applying a scanning voltage gradient across said semiconductor material, and output circuit means coupled to said collector means.

18. The combination defined in claim 17, wherein said scanning voltage means comprises a pair of vertical scan electrodes attached to opposing edges of said semiconductor material and a pair of horizontal scan electrodes attached to opposing edges of said semiconductor material at right angles to said vertical scan electrodes, a vertical scanning voltage generator coupled to said vertical scan electrodes, a horizontal scanning voltage generator coupled to said horizontal scan electrodes and said horizontal and vertical scanning generators being adapted to produce voltage gradients operable to periodically scan the surface of said semiconductor material on a line by line basis.

19. The combination defined in claim 18, wherein said vertical scan generator is adapted to produce an output pulse of variable magnitude and wherein said horizontal scan generator is adapted to produce an output pulse of fixed magnitude and wherein the output pulse of said vertical scan generator precedes the output pulse of said horizontal scan generator.

20. The combination defined in claim 19, wherein said collector means comprises a plurality of individual collector elements spaced along one side of said semiconductor plate, and wherein the output pulse of said vertical scan is variable in predetermined increments of amplitude, each increment of amplitude being of such magnitude as to displace said free carriers by a linear distance equal to a predetermined fraction of the spacing between adjacent collector elements.

No references cited.